United States Patent [19]

Schroeder

[11] Patent Number: 4,696,120
[45] Date of Patent: Sep. 29, 1987

[54] FISHLINE SNAP CONNECTOR

[76] Inventor: Donald R. Schroeder, Rte. 3, Box 54, Amery, Wis. 54001

[21] Appl. No.: 14,728

[22] Filed: Feb. 13, 1987

[51] Int. Cl.⁴ ............................................. A01K 91/04
[52] U.S. Cl. ..................................... 43/44.83; 24/237; 43/43.1
[58] Field of Search .................... 43/44.83, 43.1, 44.95, 43/42.49; 24/237

[56] References Cited

U.S. PATENT DOCUMENTS

| | | | |
|---|---|---|---|
| 745,131 | 11/1903 | Abbath | 24/237 |
| 1,728,560 | 9/1929 | Goshorn | 43/44.83 |
| 2,173,750 | 9/1939 | Braconi | 43/44.84 |
| 2,371,295 | 3/1945 | Hopkins | 24/237 |
| 3,277,549 | 10/1966 | Bradshaw | 43/42.49 |
| 3,335,472 | 8/1967 | Imai | 43/43.1 |
| 3,750,240 | 8/1973 | Fridrich | 24/237 |
| 4,234,998 | 11/1980 | McMickle | 24/237 |
| 4,656,699 | 4/1987 | Maahs | 24/237 |

*Primary Examiner*—Gene P. Crosby
*Attorney, Agent, or Firm*—James R. Cwayna

[57] ABSTRACT

A connector particularly designed for attaching fishing lures to fishing lines quickly and effectively. The connector includes a continuous spring steel member particularly shaped to provide a pair of spring loops, one of the loops providing a first ring for connecting the same to a key ring loop or the like with the second such spring loop arranged intermediate along one of the arms of the clip to provide a snap lock force to an engaging hook arranged on the ultimate end of the arm. The unit then provides a pair of spring loops, one at the end of the clip and the other intermediate one of the arms thereof with two such arms being provided and each such arm having a connecting hook to provide interconnection to each of the arms. The dual spring loop assembly provides a more positive connecting relation between the arms of the clip and the dual hook effect respectively on the ends of each of the arms provides a wider and more accessible opening for the user to attach a lure thereto.

8 Claims, 4 Drawing Figures

FISHLINE SNAP CONNECTOR

FIELD OF THE INVENTION

This invention relates generally to snap connectors and the like and more particularly to a snap connector for attaching fishing lures to fishing lines which snap connector includes a dual spring loop configuration with one such loop being arranged at one end of the connector and the other loop being arranged intermediate one of the arms thereof such that when in closed position the two spring loops insure positive locking of the connector and when open provide an area of easy access for attachment of the lure to the connector.

SUMMARY OF THE INVENTION

A snap connector particularly designed for attaching fishing lures to fishing lines. The snap connector is formed of a continuous member of spring steel or the like or a metallic wire member which may be initially bent and thereafter treated to provide the proper spring requirements of a snap clip. The wire is formed with a short hook on one end thereof of what may be termed an arm, extending from the hook to a first coil spring loop with the wire then forming a second arm with a second spring loop formed intermediate thereof and extending from said loop to a generally curved area and thereafter extending from a curved area to an angularly formed area designed to receive the first of the said hooks and extending therefrom to form a second hook which engages on the second of said arms intermediate the first spring loop and the second spring loop.

The dual spring loop configuration provides a coil spring at one end thereof which will urge the two arms of the clip outwardly from each other and the second spring loop formed on the second of said arms will further serve to spread the second hook portion from the arm containing the spring loop.

With applicant's configuration of a double spring loop assembly, what may be termed a stationary arm is provided having a coil spring loop on one end thereof and a second loop formed intermediate the length thereof with a curvilinear lure connecting portion at the end of the second arm with a pair of free arms extending respectively from the first coil loop and the curvilinear end of the stationary member with means for interengaging these two arms to provide a dual snap and doubly positive clipping arrangement.

BACKGROUND AND OBJECT OF THE INVENTION

Use of spring clips to fasten fishing lures to fishing lines is old in the art. Basically these units are constructed very much as a normal safety pin in that a single spring loop provides a biasing force against what may be termed a moveable arm with the second arm extending from the spring loop providing a capturing end to capture the first of the arms therein. Fishermen know that these spring clips are not necessarily positive in their use and many fish are lost due to failure of the connector portions of the unit.

Applicant has searched the prior art and has failed to find any commercially available articles nor previously patented articles which include what is termed a double hook or double fastening arrangement with a double spring loop concept. The prior art is provided on the inventor's prior art statement which forms a part of this application. None of the prior art patents provide what the inventor terms this double hooking and double spring loop concept. The basic advantage with such concept is that a dual spring force is provided and the moveable arms of the clip are hooked to one another and the dual spring loop arrangement provides an increased biasing force acting against each of the arms with the actual effect of the spring loop arrangement substantially increasing the clip strength of the device.

It is therefore an object of the applicant's invention to provide a snap connector particularly designed for attachment of fishing lures to fishing lines which includes a double hook assembly where a pair of arms are provided having hook engagement ends thereof to engage the other arms of the device in such a manner as to positively but releasably lock the same to one another while providing an area to receive the normally provided connective eye of a fishing lure.

It is still a further object of the applicant's invention to provide a snap connector for fishing lines, or for attachment of any other articles which require a quick release but positive capturing arrangement, whcih includes a pair of biasing members arranged respectively at the end and along the length of one of the connective arms such that a double biasing force is provided with the force thereof being directed at other arms of the snap connector.

It is still a further object of the applicant's invention to provide a snap clip connector for the connection of fishing lures to fishing lines which includes a formed member of a continuous wire or rod including a spring loop formation at one end thereof which provides an attachment aperture with a second spring loop provided intermediate one of the arms extending from the first loop and said arm continuing thereafter to provide a curved lure connecting area such that both of the coil spring loop members are not located at the ultimate ends of the clip.

These and other objects and advantages of the inventor's concept will more particularly appear from a consideration of the accompanying disclosure and the accompanying drawings.

DESCRIPTION OF A PREFERRED FORM OF THE INVENTION

Figure 1:
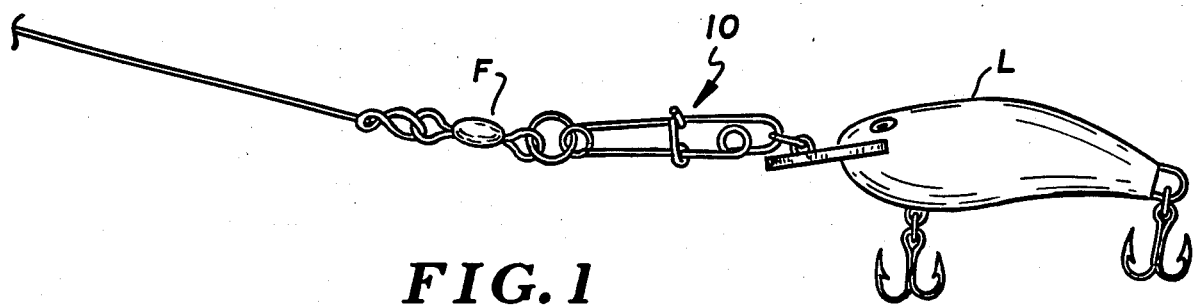
FIG. 1 is a view illustrating the use of the inventor's snap connector to connect a fishing lure to a fishing line.

In accordance with the accompanying drawings applicant's snap connector generally designated 10 is illustrated in FIG. 1 in position to attach a lure L to a fishing line F which may have a leader or other connections provided at the end thereof. As particularly illustrated in FIGS. 2, 3 and 4 the snap connector 10 may also be provided with an attachment ring 11 such that a single width of material is provided for the line attachment means whereas the coil loop of the clip may provide a slightly wider attachment area for attaching the device to a line or leader combination. It should be understood that the connector device 10 may be provided with or without the single ring member 11 without departing from the scope of the invention, the primary invention however being the connector device 10.

As illustrated in the accompanying drawings the connector device 10 is provided with a single spring steel wire or rod of minimal diameter which is formed to a specific shape. If the material is not initially of spring quality it may obviously be heat treated to provide the spring force required.

As illustrated in the accompanying drawings the rod or wire 12 is coiled as at 13 to provide a spring loop and for descriptive purposes this may be considered to be the primary formation point. Extending from the coil loop 13 is a first 14 and second 15 arm. Arm 14 is substantially shorter than arm 15 and terminates in a hook section 14a at the end thereof. As illustrated in the drawings, arm 14a is approximately one-half of the entire length of the connector 10.

The second arm 15 extends from the coil 13 to a curvilinear lure receiving end 16 and intermediate the spring loop 13 and the curvilinear end 16 a second spring coil 17 is formed. As illustrated in the drawings this spring loop 17 is more than one-half the distance from the first spring coil 13 to the curvilinear lure attachment area 16. The second arm 15 continues past the curvilinear section 16 so as to retrace itself towards the first loop 13 and for purposes of description this returning section is designated 15a. Section 15a is provided with a substantially right angle bend 15b spaced a predetermined distance from curvilinear section 16 and being of such a dimension that the aforementioned hook element 14a of the first arm 14 will engage the arm section 15a at this right angle 15b area. The arm section continuing after such bend is designated 15c and a hook portion 15d is formed at the ultimate end of the arm length 15c.

Figure 2:
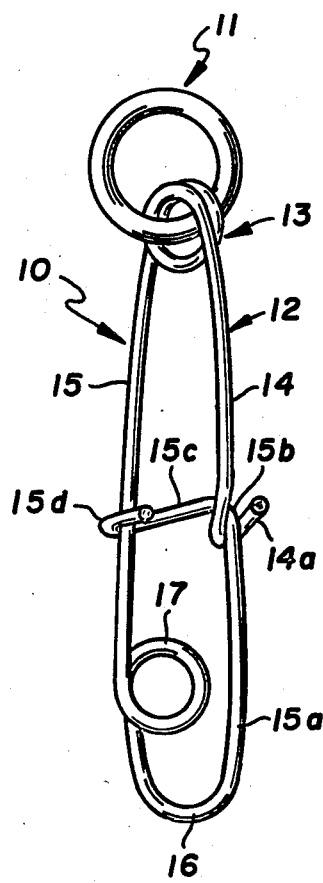
FIG. 2 is a side elevation of the connector illustrating the same in closed position.
Figure 3:
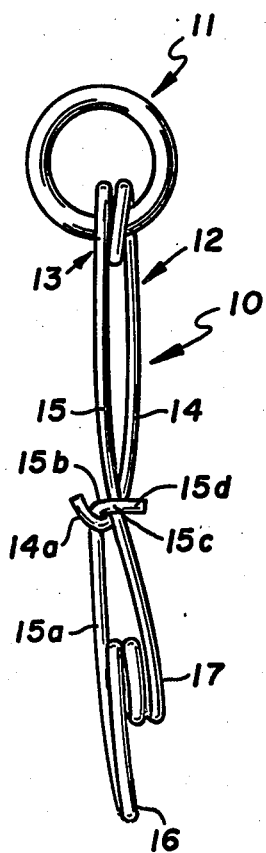
FIG. 3 is a side elevation taken from the view of FIG. 1.

As particularly illustrated in FIG. 2 this second hook section 15d is designed to releasably attach to the main arm portion 15 intermediate the first 13 and second 17 coil loops. In this position the hook 14a of the first mentioned arm 14 will engage the right angle bend area 15b of the continuing arm length 15a-15c of the second arm 15 of the unit.

As should be obvious from this description the normal biasing of arm 14 and arm 15 is outwardly from the first coil loop 13 so as to normally urge the two arms 14-15 away from each other. As also should be obvious the second loop 17 will tend to spread arm section 15 and the continuing arm sections 15a-15n-15c-15d away from each other and tend to bring the entire arm 15 into a straight line condition. Hook 15b prevents this action and a first hooking and baising function is attained with this interconnection strictly limited to the arm 15 and its continuing portions 15a-15b-15c and 15d. The second biasing function is attained with the inter-connection of hook 14a of arm 14 into the right angled area 15b of the second arm 15. With the two hooking elements 14a, 15b engaging the respective arm 15 and the right angle section 15b thereof the normal forces of the spring loops 13 and 17 will be to draw the hook 15d through a multiple action of the spring loops against arm 15. This multiple action occurs by the spreading or tendency to spread of arms 14-15 and the tendency of arm sections 15 and 15a to spread. In this manner then a multiple force is provided to lock the elements together.

Figure 4:
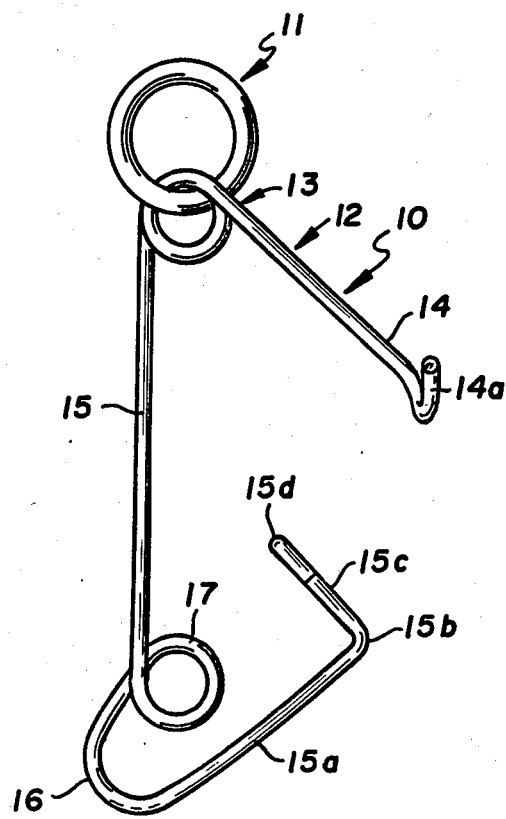
FIG. 4 is a view similar to FIG. 2 and illustrating the connector in open position.

As illustrated in FIG. 4 the connector 10 when in its open position provides a relatively large area for connection of the lure to the device.

It should also be obvious from the drawings that providing a longitudinal or axial force to the device will not tend to disengage the hooked elements. This is a common fault with the available single clasp elements in that the hook male end may easily be drawn from the female receiver simply due to displacement of the two elements. With the applicant's device this displacement is not possible and, if anything, a longitudinal force tends to tighten the two elements into a more positive locked configuration.

With applicant's concept it has been found that a substantially lighter or smaller gauge wire may be utilized while effectively retaining the required strength for large game fish. It should also be noted that the curvilinear end 16 of the connector end allows for free movement of the lure in that it is a single width area with no constrictions or restrictions of movement being applied to the attached lure.

It should be obvious from this description that applicant has provided a new and unique concept for a snap connector for attaching lures to fishing lines in that a double locking arrangement is provided with a double spring loop biasing action which spring loops act against one another in their tendency to unwind which effectively increases the locking and connective force of the device.

What I claim is:

1. A snap connector for connecting lures to fishing lines and the like, said connector including:
   a. a wire of predetermined length and of a material to provide a spring force tending to return the wire to a straight condition;
   b. a first spring loop formed in said wire to provide a pair of arms;
   c. a first of said arms being substantially shorter than the second of said arms and being provided with a formed hook on the ultimate end thereof;
   d. the second of said arms providing a second spring loop spaced from said first spring loop with a portion of said second arm extending beyond said second loop; and,
   e. said second arm extending portion providing an engagement area to receive said hook of said first arm and further providing a formed second hook on the ultimate end thereof to engage with the length of said second arm intermediate said first and second spring loops.

2. The structure set forth in claim 1 and said second arm extending portion providing a curvilinear, lure receiving area intermediate said second loop and said hook engagement area for attachment of a fishing lure thereto.

3. The structure set forth in claim 1 and said hook engagement area of said second arm extending portion provided by forming a substantially right angle bend therein, such that said second formed hook may engage with a portion of said second arm intermediate said first and second spring loops.

4. The structure set forth in claim 1 and said first arm being of a length to engage said second arm within said defined engagement area.

5. The structure set forth in claim 1 and a ring member being provided in said first spring loop for attachment of said connector to a fishing line.

6. A snap connector for connecting lures to fishing lines and the like, said connector including:

a. a wire of predetermined length and of a material providing a spring force tending to return the wire to a straight condition;
b. a pair of spring loops formed in said wire and being spaced therealong to provide a pair of arms one of which extends from each of said spring loops;
c. a first of said arms being provided with a formed hook on the ultimate end thereof;
d. the second of said arms being provided with a hook engagement area to receive said hook of said first arm and being provided with a hook at the ultimate end thereof; and,
e. said second arm being formed to provide the hook end thereof in engageable position to lock with the length of wire between said spring loops.

7. The structure set forth in claim 6 and said hook engagement area of said second arm including a generally right angle bend formed therein.

8. The structure set forth in claim 6 and said second arm providing a curvilinear, lure receiving area such that a fishing lure may be positioned with said engagement area and a second of said spring loops.

* * * * *